United States Patent Office 3,169,118
Patented Feb. 9, 1965

3,169,118
COMPOSITIONS AND PROCESSES FOR
BREAKING PETROLEUM EMULSIONS
Willard H. Kirkpatrick, Sugar Land, and Virgil L. Seale
and Alice W. Church, Houston, Tex., assignors to
Nalco Chemical Company, a corporation of Delaware
No Drawing. Filed Oct. 31, 1960, Ser. No. 65,939
12 Claims. (Cl. 252—341)

This invention relates to new and useful chemical compositions having surface-active properties and capable of lowering the interfacial tension between water and oil, especially in water-in-oil emulsions. The invention relates particularly to the treatment of emulsions of mineral oil and water, such as petroleum emulsions commonly encountered in the production, handling and refining of crude mineral oil, for the purpose of separating the oil from the water. Also, the invention relates to the treatment of other water-in-oil type of emulsions wherein the emulsions are produced artificially or naturally and the resolution of the emulsions presents a problem of recovery or disposal. An important aspect of the invention is concerned with the employment of the compositions of the invention in desalting.

This application is a continuation-in-part of our copending application, Serial No. 635,580, filed January 23, 1957, now abandoned.

Petroleum emulsions are, in general, of the water-in-oil type wherein the oil acts as a continuous phase for the dispersal of finely-divided particles of naturally occurring waters or brines. These emulsions are often extremely stable and will not resolve on long standing. It is to be understood that water-in-oil emulsions may occur artificially resulting from any one or more of numerous operations encountered in various industries. The emulsions obtained from producing wells and from the bottom of crude oil storage tanks are commonly referred to as "cut oil," "emulsified oil," "bottom settlings," and "B.S.".

One type of process involves subjecting an emulsion of the water-in-oil type to the action of a de-emulsifying agent of the kind hereinafter described, thereby causing the emulsion to resolve and stratify into its component parts of oil and water or brine after the emulsion has been allowed to stand in a relatively quiescent state.

Still another type of process involves the use of a de-emulsifying agent of the kind hereinafter described in refinery desalting operations. In the refining of many crude oils a desalting operation is necessary in order to prevent the accumulation of large deposits of salt in the stills and to prevent corrosion resulting from the decomposition of such salts under high still temperatures. In a typical desalting installation 5% to 10% of fresh water is added to the crude oil charge stock and emulsified therein by means of a pump or through a differential pressure valve. A de-emulsifying agent is added and the treated oil permitted to stand in a quiescent state for relatively short periods of time allowing the salt-laden water to stratify, whereupon it is bled off to waste resulting in 90% to 98% removal of salt content. This operation is carried out continuously as contrasted with batch treating.

In desalting operations where petroleum emulsions are created artificially and then broken, the conditions employed are usually quite different from those used in breaking water-in-oil petroleum emulsions at the well. The temperatures may range from 160° F. to 350° F. and are preferably around 190 F. to 210° F. The pressures are those which are developed by heating under autogenous pressures and may be, for example, 215 to 250 pounds per square inch gauge. The time of heating is subject to variation but is usually around 15 to 30 minutes. Since a refinery unit may handle up to 50,000 barrels of oil per day and the amount of salt present may be, for example, 15 pounds to 250 pounds of salt per thousand barrels of oil, it will be appreciated that the separation of this salt is very important, especially since it is usually desired to reduce the salt content of the oil by at least 90%.

One of the objects of the present invention is to provide a new and useful composition of matter which is water-wettable, interfacial and surface-active in order to enable its use as a de-emulsifier or for such uses where surface-active characteristics are necessary or desirable.

A further object of the invention is to provide a new and improved process for resolving water in petroleum oil emulsions into their component parts of oil and water or brine.

An additional object of the invention is to provide a new and improved process for desalting petroleum oils. Other objects will appear hereinafter.

In accordance with the invention, the crude oil de-emulsifying agents are esters of monocarboxylic and/or polycarboxylic organic acids and oxyalkylated condensation products obtained by reacting phenols which are primarily difunctional alkyl phenols, the alkyl groups having an average of 4–15 carbons, formaldehyde, and alkylene polyamines. Ortho-, ortho- or para-, ortho-dialkyl phenols per se are not suitable for compositions of this invention, but amounts up to 25% of said dialkyl phenols in the difunctional, alkyl phenol reactant may be tolerated. Dialkyl phenols with one alkyl group in the ortho- or para-position and one alkyl group in the meta-position are difunctional phenols for the purposes of this invention. The term "difunctional phenol" relates to the methylol-forming reactivity of the phenol with formaldehyde. The preferred alkylene polyamines are those having two primary amino groups, e.g., ethylene diamine, propylene diamine-1,2, hexamethylene diamine, diethylene triamine, triethylene tetraamine, tetraethylene pentamine, higher polyalkylene polyamine homologs thereof up to about 10 amino groups per molecule mixtures thereof, and the corresponding 1,2- and 1,3-polypropylene polyamines. The terminal amino groups of the alkylene polyamines, however, may be secondary amino groups such as those in N-substituted alkyl (1–8 carbons), benzyl, or phenyl alkylene polyamines.

The preferred phenols used in the condensate polymers are monoalkyl phenols having the alkyl group in the functional positions of the phenolic ring upon which methylol groups form in the reaction with formaldehyde, i.e., the ortho- or para-positions. The alkyl groups in the phenolic substituent may be the same or they may be different, as when a mixture of alkyl phenols is the phenolic reactant. The average number of carbons in the alkyl groups of the phenolic reactant should be in the range of about 4–15. Alkyl groups of 4–9 carbons are preferred.

Examples of such phenols are o-n-butyl phenol, o-isobutyl phenol, p-n-butyl phenol, p-isobutyl phenol, p-tert. amyl phenol, o-octyl phenol, p-octyl phenol, o-nonyl phenol, p-nonyl phenol, o-dodecyl phenol, p-dodecyl phenol, mixtures of o-phenols and p-alkyl phenols, mixtures of ortho- or para-alkyl phenols with up to 25% o-, p-dialkyl phenols with 4–15 carbons in the alkyl groups such as the commercially available mixture of about 90% p-nonyl phenol with about 10% o-, p-dinonyl phenol, and mixtures of difunctional monoalkyl phenols whose alkyl groups average at least about 4 carbons and not more than about 15 carbons, e.g., mixtures of p-octyl phenol and p-nonyl phenol, a mixture of about 30% p-isopropyl phenol and 70% p-octyl phenol, and the like.

The oxyalkylating agents are lower alkylene oxides, e.g., ethylene oxide, 1,2-propylene oxide, or mixtures of ethylene oxide and 1,2-propylene oxide and the weight ratio of the alkylene oxide to the phenol-formaldehyde-polyamine condensation product will, for most applications, fall between about 2:3 and 10:1, or even higher, respectively. The phenol-formaldehyde-polyamine condensation products contain about 4 to 15 phenolic nuclei per resin molecule.

Where both ethylene oxide and propylene oxide are used to oxyalkylate the condensation product, they may be reacted as a mixture or the oxides may be added sequentially—e.g., the propylene oxide being added to the resin first and the ethylene oxide being added to the oxypropylene groups. In the latter case, the terminal oxyalkylated groups are those of oxyethylene, which have primary hydroxyl groups. The terminal oxypropylene groups have a secondary hydroxy group. Simultaneous reaction of a mixture of the oxides probably gives an oxyalkylated product having both types of terminal hydroxy groups. Oxyalkylated resins having at least some primary hydroxyl groups are preferred for purposes of this invention because the primary hydroxyl groups

esterify more readily with the carboxylic acids than secondary hydroxyl groups

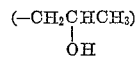

The oxyalkylated-phenol-formaldehyde-alkylene polyamines herein described and uses thereof are disclosed and claimed in an application of Willard H. Kirkpatrick and Virgil L. Seal, filed concurrently with this application, which is incorporated herein by reference.

PHENOL-FORMALDEHYDE-POLYAMINE CONDENSATION

The phenol-formaldehyde-alkylene-polyamine condensation products are prepared by reacting formaldehyde or a substance which breaks down to formaldehyde under reaction conditions, e.g., paraformaldehyde or trioxane, the difunctional, alkyl phenol, often preferably a crude mixture of alkylated phenols for economic reasons, and the alkylene polyamine by heating the reactants in the presence of a small amount of an alkaline catalyst such as sodium hydroxide under the reaction temperatures and conditions causing the elimination of water of reaction. The condensates are phenolic and alkylene polyamine amine residues connected by methylene bridges. In some cases, the polyamine itself serves as the alkaline catalyst.

The condensation reaction preferably is carried out under substantially anhydrous conditions—excepting the water produced during the reaction. The aqueous distillate which begins to form when the reactants are heated is collected and removed from the reaction mixture.

The phenol-formaldehyde-polyamine condensation product may be prepared by agitating and heating a mixture of the three reactants. In this case, the presence of the polyamine provides sufficient alkalinity for the condensation reaction. Alternatively, the alkyl phenol and formaldehyde may be only partially condensed—e.g., by heating these reactants alone for a shorter period of time than necessary to obtain complete condensation and leaving in the reaction mixture some unreacted phenol and formaldehyde. The reaction mixture is then cooled somewhat, and the alkylene polyamine is added to the reaction mixture. Heat is again applied to remove the water of reaction. Heating is continued until the amount of aqueous distillate collected indicates that the condensation is complete. Alternatively, the alkyl phenol may be precondensed with a portion of the formaldehyde in the form of precursor phenol-formaldehyde intermediate condensate. The intermediate condensate is thereafter further condensed by reacting it with the remainder of the formaldehyde and the alkylene polyamine thereafter added to the precursor condensate.

This aspect of the invention is illustrated in the following examples, but is not limited thereto.

Example A

In a three-necked reaction flask provided with means of mechmanical stirring and a return condenser system permitting the removal of any aqueous phase formed in the course of the reaction, there were added 750 parts of a crude alkylate phenol which comprises an undistilled p-nonylphenol containing approximately 10% of o-, p-dinonyl phenol, 100 parts paraformaldehyde and 2 parts of finely-divided sodium hydroxide which was present as a catalyst in the reaction. These materials were heated to 60° C., and at this point the source of heat was removed. The temperature rose slowly to approximately 110° C., at which point it was held for two hours. At this point 250 parts of a suitable hydrocarbon extract was added, and heat was applied to remove 36 parts of aqueous distillate at a maximum temperature of 150° C. The reaction mass was cooled to 130° C., and at this point was added 100 parts of a crude mixture of polyethylene polyamines, approximately 10% of which was triethylenetetramine, 40% tetraethylenepentamine, and the remainder homologs higher than tetraethylenepentamine. Heat was again applied to remove 22 parts of aqueous distillate with a maximum final temperature of 220° C. At this point the material was cooled at 150° C., and 250 parts of a suitable hydrocarbon extract was added to give the finished phenol-formaldehyde-alkylene polyamine resin.

Example B

In a manner similar to Example A, 750 parts of the same crude mixture of alkyl phenols, 110 parts paraformaldehyde and 2 parts sodium hydroxide were heated for 2 hours at temperatures in the range of 100–110° C. After this period of heating, 250 parts of a suitable hydrocarbon extract were added, and 36 parts of aqueous distillate were removed with a maximum final temperature of 135° C. The reaction mass was then cooled to 90° C., and 50 parts of diethylene triamine were added. The material was again heated to remove an additional 32 parts of aqueous distillate with a maximum final temperature of 210° C. The material was cooled to 150° C., and 250 parts of a suitable hydrocarbon extract were added to give the finished resin.

Example C

In a manner similar to Example A, 750 parts of the same crude mixture of alkyl phenols, 120 parts of paraformaldehyde and 2 parts sodium hydroxide were reacted for a period of 2 hours at temperatures between 100–110° C. After this period of heating, 250 parts of a suitable hydrocarbon extract were added and the temperature raised to remove 36 parts of aqueous distillate with a maximum temperature of 136° C. The material was cooled to 100° C., and at this point 60 parts of the crude mixture of higher polyethylene polyamines, as described in Example A, were added. The reaction mass was again further heated to remove an additional 36½ parts of aqueous distillate with a maximum final temperature of 212° C. The material was then cooled to 150° C., and 250 parts of a suitable hydrocarbon extract were added to give the finished resin.

Example D

In a manner similar to Example A, 3750 parts of the same crude mixture of alkyl phenols, 700 parts paraformaldehyde and 20 parts sodium hydroxide were reacted at temperatures between 100–110° C. for a period of 2 hours. At the end of this period of heating 2000 parts of a suitable hydrocarbon extract were added, and the temperature was raised to remove 200 parts of aqueous distillate with a maximum final temperature of 116° C. At this point, 1000 parts of a suitable hydrocarbon extract, and 350 parts diethylene triamine were added. The temperature is again raised to remove 255 parts aqueous distillate with a maximum final temperature of 210° C. This gives the finished resin.

Example E

In a three-necked reaction flask provided with means of mechanical stirring and a return condenser system permitting the removal of any aqueous phase formed in the course of reaction, there is added 500 parts of the same crude alkyl phenol mixture as described in Intermediate Example A and 70 parts of diethylenetriamine. These materials are heated together to approximately 60° C. at which point the addition of paraformaldehyde is begun. Then 108 parts paraformaldehyde are added slowly and in portions in such a manner to maintain the temperature of the reaction mass below 90° C. After the addition of the paraformaldehyde has been completed, 200 parts of a suitable hydrocarbon extract are added and the temperature raised to remove aqueous distillate in the amount of 55 parts with maximum final temperature of 200° C. This gives the finished phenol-formaldehyde-alkylene polyamine resin.

The ratio of amine to phenol in the above example is calculated to give about one basic nitrogen per mole of phenol. It should be further noted in this example that the amine operates as a reactive catalyst, or in other words, no sodium hydroxide or other alkaline material is used as a catalyst.

Example F

In a manner similar to Example E, 500 parts of the crude mixture of alkyl phenols and 103 parts of diethylenetriamine are reacted with 120 parts of paraformaldehyde. After the addition of the paraformaldehyde is completed, 200 parts of a suitable hydrocarbon extract are added and the temperature raised to remove 69 parts of aqueous distillate with a maximum final temperature of 176° C. This gives the finished resin.

In the above example it might be noted that the ratio of amine to phenol provides about one primary amino group per mole of phenol. Also, as in Example E, the amine functions as a reactive catalyst.

The alkylene polyamine serves as a linking radical in the polymer chain, connected at two amino nitrogens by a methylene group, supplied by the formaldehyde, to the phenolic nuclei and possibly partly to other alkylene polyamine groups. With alkylene polyamines containing two terminal primary amino groups, such as those heretofore named, the reaction with formaldehyde in all probability is at the terminal primary amino groups.

The ratio of the phenol to the alkylene polyamine in the polymer condensate ranges from about 1:1 to about 10:1, respectively, and the molar quantity of the reacted aldehyde is in the range of about 0.9 to about 1.5 times the total reacted mols of the phenol and the alkylene polyamine. With polyamines containing only 2, 3, or 4 amino groups, the mol ratio of phenol to polyamine preferably ranges from about 1:1 to 4:1, respectively. At least some phenol and polyamine residues in all of the various types of condensates will be linked by the characteristic group,

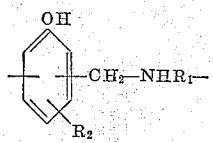

wherein $R_2$ is the alkyl group in the o- or p-position, the methylene bridge is in the o- or p-position, and $R_1$ is the remainder of the polyamine residue. Some of the polymeric condensates will have at least one of the following linking groups, (a)

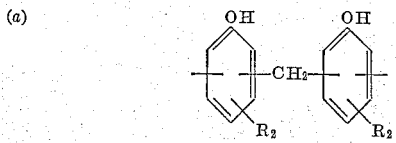

(b)                 $-R_1NH-CH_2-NHR_1-$ wherein the methylene bridge in (a) and $R_1$ and $R_2$ are as above described. In all of the condensates, at least a portion of the alkylene polyamine residues are chemically combined internally in the structure of the phenol-formaldehyde-alkylene polyamine resins.

OXYALKYLATION OF THE CONDENSATION PRODUCTS

Having prepared the intermediate phenol-formaldehyde-polyamine condensation products, the next step is the oxyalkylation of the condensation product. This is achieved by mixing the intermediate phenol-formaldehyde-polyamine condensation product in a hydrocarbon solvent with a small amount of sodium hydroxide in an autoclave. The condensation product is heated above 100° C., and preferably not over about 180° C., and the alkylene oxide is charged into the autoclave until the pressure is in the vicinity of 75 to 100 p.s.i.

The reaction mixture is gradually heated until an exothermic reaction begins. The external heating is then removed, and alkylene oxide is added at such a rate that the temperature is maintained between about 150–160° C. in a pressure range of 80 to 100 p.s.i. After all of the alkylene oxide has been added, the temperature is maintained for an additional 10 to 20 minutes to assure substantially complete reaction of the alkylene oxide. The resulting product is the alkylene oxide adduct of an alkyl phenol-formaldehyde-polyamine condensation product, in which the weight ratio of the oxide to the condensation product is between about 2:3 and 10:1, respectively, or even slightly higher.

Some preferred embodiments of the oxyalkylated, alkyl phenol-formaldehyde-polyamine condensation products and methods of their preparation are illustrated in the following examples wherein all parts are by weight unless otherwise stated, but the invention is not limited thereto.

Example G

In an autoclave having a nominal capacity of 5 gallons, equipped with a means of external heating, cooling and mechanical agitation, there is charged 22 parts of the resin of Example D. Into a transfer bomb there is charged 25 parts ethylene oxide. The reactants are heated to 145° C., and the ethylene oxide is added until the reactor pressure is 30 p.s.i. The reaction mixture is gradually heated until an exothermic reaction begins to take place. The external heating is then removed, and ethylene oxide is added at such a rate that the temperature is maintained between 150–160° C. with a pressure range of 80 to 100 p.s.i. After approximately two hours, 22 parts of ethylene oxide has been added to the autoclave, and the temperature is maintained for additional 30 minutes to make sure that the unreacted oxide is reduced to a minimum. The resulting product is the ethylene oxide adduct of a phenol-formaldehyde-alkylene polyamine resin in which the ratio of oxide to resin by weight is about 1 to 1.

Example H

In a manner similar to Example G, a mixed oxide adduct of the resin of Example D was prepared in which the ratio of ethylene oxide to propylene oxide was 1 to 1. The finished product is a material in which the ratio of mixed oxides to resin is 6 to 1.

Example J

In a manner similar to Example G, a mixed oxide adduct of the resin of Example D was prepared in which the ratio of ethylene oxide to propylene oxide is 1 to 2. The finished product contains a ratio of 6 parts of mixed oxides to 1 part of resin.

Example K

In a manner similar to Example G, 4 pounds of the resin of Example D and 1 part of sodium hydroxide are charged into a 5 gallon autoclave. These materials are heated to 145° C., and 36 pounds of propylene oxide are added over a period of approximately 8 hours at temperatures in the range of 145–150° C. and pressures in the range of 60–80 p.s.i. After the addition of the propylene oxide was completed, the material was further heated for a period of 2 hours so that residual propylene oxide is reduced to a minimum. The finished product is a propylene oxide adduct of the phenol-formaldehyde-polyamine resin in which the ratio of propylene oxide to resin is 9 to 1.

*Example L*

In a manner similar to Example G, 8 pounds of the finished product of Example K are charged into a 5 gallon autoclave. At temperatures between 150–160° C., 2 pounds of ethylene oxide are added, and the material is further heated for a period of 30 minutes to allow the reactor pressure to drop to a constant value. The finished product is a sequential propylene oxide-ethylene oxide adduct of a phenol-formaldehyde-polyamine resin in which the ethylene oxide content is 20% by weight.

*Example M*

In an autoclave having a 2-liter capacity, equipped with a means of external heating, internal cooling coils and mechanical agitation, there is charged 400 parts of the resin of Example B and 1 part sodium hydroxide. Into a transfer bomb there is introduced 605 parts ethylene oxide. The resin intermediate is heated to 140° C., and ethylene oxide is charged into the reactor until reactor pressure is 80 p.s.i. The reaction mixture is gradually heated until an exothermic reaction begins to take place. The external heating is then removed, and ethylene oxide is added at such a rate that the temperature is maintained between 150–160° C. with a pressure range of 80–100 p.s.i. After approximately 3 hours all of the oxide has been added to the autoclave, and temperature is maintained for an additional 30 minutes to make certain that the unreacted oxide is reduced to a minimum. The resulting product is the ethylene oxide adduct of a phenol-formaldehyde-polyamine resin in which the ratio of oxide to resin is 3 to 2 by weight.

*Example N*

In a manner similar to Example M, 504 parts of the resin of Example A and 515 parts of ethylene oxide are reacted. The finished product is the ethylene oxide adduct of a phenol-formaldehyde-polyamine resin in which the ratio of oxide to resin is 1 to 1 by weight.

*Example O*

In a manner similar to Example M, 600 parts of the resin of Example E was reacted with 400 parts of ethylene oxide which gives a finished product in which the ratio of oxide to resin is 2 to 3 by weight.

*Example P*

In an autoclave having a two-liter capacity, equipped with a means of external heating, internal cooling coils and mechanical agitation, there is charged 400 parts of the resin of Example E and 2 parts sodium hydroxide. Into a transfer bomb there is introduced 300 parts of ethylene oxide and 900 parts propylene oxide. The resin is heated to 145° C., and the mixed oxides are charged into the reactor until reactor pressure is 60 p.s.i. The reaction mixture is gradually heated until an exothermic reaction begins to take place. The external heating is then removed, and the mixed oxides are added at such a rate that the temperature is maintained between 145–150° C. with a pressure range of 80–100 p.s.i. After approximately 4 hours all of the oxide has been added to the autoclave, and the temperature is maintained for an additional 2 hours to make certain that the unreacted oxide is reduced to a minimum. The resulting product is the mixed oxide adduct of a phenol-formaldehyde-polyamine resin in which the ratio of mixed oxides to resin is 3 to 1 by weight.

*Example Q*

In an autoclave having a two-liter capacity, equipped with means of external heating, internal cooling coils and mechanical agitation, there is charged 700 parts of the resin of Example F and 2 parts sodium hydroxide. Into a transfer bomb there is introduced 700 parts propylene oxide. The intermediate is heated to 135° C., and the propylene oxide is charged into the reactor until reactor pressure is 50 p.s.i. The reaction mixture is gradually heated until an exothermic reaction begins to take place. The external heating is then removed, and propylene oxide is then added at such a rate that the temperature is maintained between 135–145° C. with a pressure range of 60–80 p.s.i. After approximately 6 hours all of the propylene oxide has been added to the autoclave, and the temperature is maintained for an additional 2 hours to make certain that the unreacted propylene oxide is reduced to a minimum. The resulting product is the propylene oxide adduct of a phenol-formaldehyde-polyamine resin in which the ratio of oxide to resin is 1 to 1 by weight.

*Example R*

Four hundred fifty parts of the finished product of Example Q is charged into a two-liter autoclave, and 50 parts ethylene oxide are added at temperatures between 150–160° C. After the oxide has been added the autoclave is further heated until a constant pressure value is observed. The resulting product is a sequential propylene oxide-ethylene oxide adduct of a phenol-formaldehyde-polyamine resin in which there is 10% of ethylene oxide by weight.

*Example S*

In a manner similar to Example G, an ethylene oxide adduct of a resin of Example C was prepared in which the ratio of oxide to resin is 2 to 3 by weight.

In using mixtures of ethylene oxide and propylene oxide in oxyalkylation, it is preferred that the weight ratio of ethylene oxide to propylene oxide be between about 1:4 and 4:1. A considerably lower ratio of ethylene oxide to propylene oxide may be employed where the oxides are added sequentially in the manner heretofore described.

ESTERIFICATION OF THE OXYALKYLATED CONDENSATION PRODUCTS

The next and final step in the preparation of the compositions of our invention is the esterification of the oxyalkylated phenol - formaldehyde - polyalkylene polyamine condensation products with monocarboxylic or polycarboxylic organic acids. The polycarboxylic acids are usually dicarboxylic acids or their anhydrides which are functional equivalents. The monocarboxylic acids preferably are long chain aliphatic acids having at least 8 carbons. The degree of esterification may range from esterification of one hydroxyl group per phenol-formaldehyde-polyalkylene polyamine resin molecule to complete esterification of the reactive hydroxyl groups; and, in the case of the dicarboxylic acids, or their anhydrides, the degree of esterification may range from esterification of one carboxyl group per molecule of the acid to essentially complete esterification of the carboxyl groups of the acid.

When polycarboxylic acids are used for esterification, the degree of esterification may range from esterification of one carboxyl group per acid molecule to complete esterification of all the carboxyl groups, as well as any stage therebetween. The compositions of this invention thus may or may not have free carboxyl groups and include polyesters of the oxyalkylated phenol-formaldehyde-alkylene polyamine resins.

The esterification step is achieved by heating the oxyalkylated resin and carboxylic acid, anhydride thereof, of mixtures of acids and/or anhydrides to a temperature sufficient to produce esterification, usually above the boiling point of water and may be carried out in a suitable hydrocarbon solvent. If water is a product of the reaction, the aqueous distillate is collected and removed from the reaction vessel. The esterification reaction is stopped when esterification is completed to the degree desired. The amount of esterification can be ascertained easily by measuring the amount of aqueous distillate where water is a reaction product.

The carboxylic acids which are used to esterify the resins of the present invention may be cyclic or acyclic monocarboxylic or polycarboxylic acids. The molecular weight of the polycarboxylic acids may vary widely—from oxalic acid to high molecular weight dimerized fatty acids prepared by dimerizing linoleic acid or mixtures of linoleic and linolenic acids. These dimerized acids are described in more detail hereinafter. The monocarboxylic acids may range from two carbon acids to 24 carbon acids and may be cyclic acids, such as the aromatic acids, or acyclic acids such as those of the fatty acid series. The acids used in esterification may be mixtures of acids such as the aliphatic monocarboxylic acids derived from coconut oil, palm oil, soybean oil, tallow, and other fats, either unhydrogenated or hydrogenated; mixtures of abietic acid and fatty acids as found in crude tall oil; and other similar commercially available mixtures of monocarboxylic acids. More than one polycarboxylic acid, similarly, may be used in preparing the esters of the present invention, and, furthermore, the oxyalkylated resins may be esterified with both monocarboxylic and polycarboxylic acids.

With respect to the monocarboxylic acids, the selection of the particular acid and the degree of esterification will depend upon the degree of hydrophilic properties of the particular resin. For equivalent amounts of oxyalkylation, ethylene oxide adducts are much more hydrophilic than propylene oxide adducts—with the adducts of mixtures of the oxides falling therebetween. In general, the higher molecular weight acids (about eight or more carbon acids) are used with highly hydrophilic resins, ethylene oxide adducts or adducts predominating in ethylene oxide. Furthermore, the greater the amount of ethylene oxide in the resin, the greater should be the degree of esterification of the hydroxyl groups of the resin in order to reduce the hydrophilic nature of the resin. For example, in an oxyalkylated resin having equal parts by weight of ethylene oxide and phenol-formaldehyde-alkylene polyamine, about ⅓ to ½ of the hydroxyl groups may be left unesterified. In oxyalkylated resins of a ratio of about two parts oxide to one part resin by weight, substantially all of the hydroxyl groups of the oxyethylene groups should be esterified. In general, for the preparation of emulsion-breaking agents, we recommend that in ethoxylation the ratio of ethylene oxide to resin be about 2:3 to about 2:1, respectively, regardless of the degree of esterification of the hydroxyl groups of the oxyethylene groups. When substantial amounts of propylene oxide are used in oxyalkylation, as in a 50:50 mixture of ethylene oxide and propylene oxide, the resins may be oxyalkylated at higher ratios than 2:1 of oxide to resin, if desired.

Among the monocarboxylic acids which may be used for esterification may be mentioned saturated aliphatic acids, e.g., acetic acid, propionic acid, butyric acid, valeric acid, caproic acid, caprylic acid, pelargonic acid, 2-ethyl hexoic acid, capric acid, lauric acid, myristic acid, palmitic acid, stearic acid, arachidic acid, behenic acid, and mixtures thereof; tall oil acids, the primary constituent of which is abietic acid; unsaturated aliphatic acids, e.g., acrylic acid, the butenic acids (crotonic, isocrotonic, vinylacetic and methacrylic acids), pentenic acids, sorbic acid, hexenic acids, oleic acid and its isomer, elaidic acid, linoleic acid, linolenic acid, ricinoleic acid, erucic acid, and mixtures thereof or mixtures with the saturated acids; aromatic acids, e.g., benzoic acid, phenylacetic acid, cinnamic acid, cresotinic acid, salicylic acid, toluic acids, and mesitylic acids; and amino acids, hydroxy acids, ether acids and keto acids, e.g., anisic acid, gallic acid, glycolic acid, lactic acid, levulinic acid and pyruvic acid.

Dicarboxylic acids or, in some instances, their anhydrides, which may be used to prepare the compositions of our invention include diglycolic, phthalic, oxalic, maleic, malonic, succinic, adipic, azelaic, sebacic, fumaric, tartronic, malic, camphoric, tartaric and terephthalic acids. Higher molecular weight polycarboxylic acids which may be used include Emery's dimer acid and VR-1 acid. Polymerization of the maleate esters through the olefinic group of maleic acid can be avoided by removing or deactivating substantially all sodium and/or potassium ions. One convenient way of doing this is to add a small amount of diglycolic acid, which deactivates the sodium and potassium ions by formation of an insoluble salt therewith.

Emery dimer acid is essentially dilinoleic acid and is a polymer made by polymerizing an unsaturated fatty acid containing at least two nonconjungated double bonds. Such acids may also be described as polymer drying oil acids. The term "drying oil acid" is used herein to mean an unsaturated fatty acid containing at least two double bonds and at least six carbon atoms. The polymer acids employed for the purpose of the invention preferably consist predominantly of dimer acids but may contain up to about 40% of trimers and higher polymers. The preferred polymer acids are those containing 12 to 40 carbon atoms and especially the polymers of the drying oil acids of the linoleic acid series, including, for example, the polymers of sorbic acid, geranic acid, palmitolic acid, linoleic acid and humoceric acid. It will be understood that these polymers may include cogeneric mixtures of polycarboxy acids.

A number of these polymer acids are available as by-product materials. Thus, one source of the polymeric acids suitable for the purposes of this invention is the still residue of the dry distillation of castor oil in the presence of sodium hydroxide. VR-1 acid is an acid of this type.

VR-1 acid is a mixture of polybasic acids, with an average molecular weight of about 1,000. It has an average of slightly more than two carboxylic acid groups per molecule. It is a by-product acid, and is a dark amber, rather viscous liquid. A typical sample of VR-1 acid gave the following analysis:

Acid number _____ 150
Iodine number _____ 36
Saponification number _____ 172
Unsaponifiable matter _____percent__ 3.7, 3.5
Moisture content _____do____ 0.86

We prefer diglycolic acid among all of the above mentioned acids as the esterifying acid. Dimerized fatty acids are also excellent acids for many purposes where more hydrophobicity is desired in the ester.

Among the suitable hydrocarbon vehicles which can be employed as diluents or solvents is sulfur dioxide extract. This material is a by-product from the Edeleanu process of refining petroleum in which the undesirable fractions are removed by extraction with liquid sulfur dioxide. After removal of the sulfur dioxide a mixture of hydrocarbons is substantially aromatic is character, remains and is designated in the trade as sulfur dioxide extract or $SO_2$ extract. Examples of other suitable hydrocarbon vehicles are toluene, xylene, gas oil, diesel fuel, bunker fuel and coal tar solvents. The above cited examples of solvents are adaptable to azeotropic distillation as would also be any other solvent which is immiscible with water, miscible with the reacting mass and has a boiling point or boiling range in excess of the boiling point of water.

Some preferred embodiments of the invention and methods of preparation thereof are illustrated in the following examples, where the parts are by weight unless otherwise indicated, but the invention is not limited thereto.

*Example 1*

In a three-necked reaction flask provided with means of mechanical stirring and return condenser system permitting the removal of any aqueous phase formed in the reaction, there is added 100 parts of the resin of Example S, 17 parts of a technical grade dimerized fatty acid, and 50 parts of a suitable hydrocarbon extract. The reaction mass is heated, and at 222° C. an aqueous distillate begins to form. After approximately 2 hours of heating, a total of 1 part of aqueous distillate has been collected with a maximum final temperature of 245° C. The material is then cooled, and 95 parts of a suitable hydrocarbon extract is added to yield the finished product.

*Example 2*

In a three-necked reaction flask provided with means of mechanical stirring and return condenser system permitting the removal of any aqueous phase formed in the reaction, there is added 100 parts of the resin of Example N, 20 parts of a technical grade dimerized linoleic acid, and 75 parts of a suitable hydrocarbon fraction, such as $SO_2$ extract. The reaction mass is heated, and at 214° C. an aqueous distillate begins to form. After approximately 3 hours of heating, approximately 1 part of aqueous distillate has been secured, with a maximum final temperature of 244° C. The material is then cooled to 150° C., and 68 parts of a suitable hydrocarbon extract is added to give the finished product.

*Example 3*

In a three-necked reaction flask provided with means of mechanical stirring and return condenser system permitting the removal of any aqueous phase formed in the reaction, there is added 200 parts by weight of the resin of Example R, 30 parts of a technical dimerized linoleic acid, 10 parts phthalic anhydride and 75 parts of a suitable hydrocarbon extract. The reaction mass is heated, and at 206° C. an aqueous distillate begins to form. After approximately 2 hours of heating approximately 1 part of aqueous distillate has been obtained with a maximum final temperature of 241° C. At this point the material is cooled to 150° C., and 80 parts of a suitable hydrocarbon extract are added to give the finished product.

*Example 4*

In a three-necked reaction flask provided with means of mechanical stirring and heating, 200 parts of the resin of Example Q and 50 parts phthalic anhydride are mixed. The materials are heated together for a period of 4 hours at 150–160° C. At the end of this time 250 parts of a suitable hydrocarbon extract are added to give the finished product.

*Example 5*

In a three-necked reaction flask provided with means of mechanical stirring and heating, there is added 200 parts by weight of the resin of Example R and 30 parts of maleic anhydride and 1.5 parts diglycolic acid. These materials are heated together for a period of 4 hours at temperatures in the range of 120–130° C. At the end of this time, 250 parts of a suitable hydrocarbon extract are added to give the finished product.

*Example 6*

In a three-necked flask provided with means of mechanical stirring and a return condenser system permitting the removal of any aqueous phase formed in the reaction, there is added 400 parts by weight of the resin of Example L, 20 parts by weight of diglycolic acid, and 50 parts by weight of a suitable hydrocarbon fraction such as $SO_2$ extract. The reaction mass is heated, and at 200° C. an aqueous distillate begins to form. After approximately 1 hour a total of 4 parts of aqueous distillate have been secured with a maximum final temperature of 260° C. The reaction mass is cooled to 150° C., and 225 parts of a suitable hydrocarbon fraction are added to yield the finished product.

*Example 7*

In a three-necked reaction flask provided with means of mechanical stirring and heating, and return condenser system permitting the removal of any aqueous phase formed in the reaction, there is added 300 parts by weight of the resin of Example M, 100 parts by weight of crude tall oil, and 100 parts by weight of a suitable hydrocarbon fraction such as $SO_2$ extract. The reaction mass is heated, and at 200° C. an aqueous distillate begins to form. After approximately 2 hours of heating, 5 parts of aqueous distillate have been secured with a maximum final temperature of 255° C. At this point the reaction mass is cooled to 150° C., and 25 parts by weight of diglycolic acid are added. The material is then further heated to remove a total of 4 parts of aqueous distillate with a maximum final temperature of 250° C. The material is then cooled and 100 parts of a suitable hydrocarbon extract are added to give the finished product.

The dimerized fatty acid used in the above examples was Eltex 401 fatty acid. It is a by-product from the production of sebacic acid and contains between 40 and 50% dimeric acids, the molecular weight as determined from the saponification number being approximately 400. The product contains 75–80% free fatty acid and has an iodine number of 50 and a saponification number of 180. The dimeric acids may also be used in a purified form in which most of the monobasic acids have been removed. The other dimer acids heretofore described may be used with equal facility in place of Eltex 401 fatty acid. Other monocarboxylic acids, dicarboxylic acids, or mixtures of acids may be esterified with the oxyalkylated resins by procedures similar to the foregoing examples.

DE-EMULSIFICATION OF WATER-IN-OIL EMULSIONS

The compositions of this invention are surface-active and are particularly suitable for the de-emulsification of naturally-occurring crude oil emulsions and emusions resulting from the afore-described desalting processes. De-emulsification is achieved by mixing the de-emulsifying agents of this invention, at a ratio in the approximate range of one part of the de-emulsifying agent to 2,000–50,000 parts of the emulsion, and thereafter allowing the emulsion to remain in a relatively quiescent state during which separation of the oil and water occurs. With naturally-occurring emulsions, the temperature of the emulsion may be 50–210° F., although temperatures of at least 120° F. are often preferred to accelerate separation of the de-emulsified water and oil phases. The de-emulsifying agents of this invention may be used in conjunction with other de-emulsifying agents from classes such as the petroleum sulfonate type, of which napthalene sulfonic acid is an example, the modified fatty acid type, the amine modified oxyalkylated phenol-formaldehyde type, and others.

The effectiveness of the compositions of this invention as de-emulsifying agents is illustrated in the following tests and data.

BOTTLE TESTING OF CRUDE OIL EMULSIONS

The bottle testing of crude oil emulsions is conducted according to the following procedure: fresh samples of the emulsion-breaking chemicals in organic solvent solution are prepared in 10% solutions. These solutions are made by accurately diluting 10 milliliters of the emulsion-breaking chemicals in 90 milliliters of a mixture of equal parts of anhydrous isopropyl alcohol and an aromatic hydrocarbon such as xylene. The mixture is agitated well until the emulsion-breaking chemical is completely dissolved.

The equipment for running the crude oil emulsion-breaking test, in addition to the foregoing 10% solutions, includes a set of six ounce graduated prescription bottles, a funnel, a graduated 0.2 milliliter pipette, a thief pipette, a centrifuge, centrifuge tubes and a thermometer. The graduated prescription bottles are filled to the 100 milliliter mark with the crude oil emulsion to be tested, preferably a sample which has been recently collected. If there is any free water in the crude oil emulsion sample collected, it is bled off before the bottles are filled. Each bottle is inverted several times with the thumb over the opening of each bottle so that the bottle will be coated with an emulsion film.

By means of the 0.2 milliliter pipette, the prescribed volume of the 10% solution of the emulsion-breaking chemical is added to the emulsion in the bottles. The bottles are then capped and given manual agitation for a predetermined number of counts. The number of counts are determined by a survey of the agitation which can be secured in the system in which the crude oil emulsion is being used. If the emulsion requires heat for treatment, the bottles are placed in hot water bath, the length of time and temperature determined by the particular plant equipment and practice in which the particular emulsion is employed. If the plant provides for hot agitation of the emulsion the bottles may be given a corresponding amount of manual hot agitation.

The bottles are then removed from the hot water bath and the water drop, presence of the bottom settlings (B.S.) layer and color and general appearance of the oil are noted.

A thief grind-out is taken on all bottles which appear to be promising. A thief grind-out is made by preparing centrifuge tubes filled with gasoline to the 50% mark. The thief pipette is set to the proper length by adjusting the rubber stopper so that the bottom of the pipette is about ¼ inch above the oil-water level of the bottle with maximum water drop. This same setting is used for all subsequent thiefings on remaining bottles. The thiefed oil from each bottle is added to the centrifuge tube to the 100% mark, and the tube is shaken. The samples are then centrifuged for three minutes.

With certain paraffin base oils a portion of the paraffin is thrown down with the B.S. If the centrifuge tubes are heated to 150° F. the paraffin will melt and be dissolved in the gasoline-oil mixture and usually will not be thrown down again with the B.S. upon centrifuging while hot. However, occasionally the paraffin will re-congeal as the tube cools during centrifuging. If this occurs, the tube is removed from the centrifuge and heated to 150° F. without shaking or disturbing the settled B.S. layer. The heated sample is then centrifuged for 15 seconds. This should give a true B.S. reading free of paraffin.

An excess chemical grind-out is then run on each centrifuge by adding several drops of a 20% solution in white gasoline or other solvent of a chemical which causes complete separation of the water and oil. With some sensitive emulsions the chemical will cause re-emulsification. In these instances it is necessary to rethief and add a lesser amount. Each tube is vigorously shaken to make sure that the packed B.S. layer is broken up and the tubes heated to 150° F. in the case of troublesome paraffin base crude oil. The samples are then centrifuged for three minutes.

During the test the speed of the water drop is observed carefully after the emulsion-breaking chemical is added to the prescription bottles. The observation of the color and brilliance of the oil in transmitted light is very important. In general, the brilliance and depth of color increases with a decrease in B.S. and W. (bottom settlings and water) content. The observations of color are made in the oil in the prescription bottles before and after heat treatment. In the ideal treatment of crude oil emulsions the oil-water line could be a sharp, clean line without any web or sludge present. Presence of a considerable amount of sludge or web is undesirable because this foreign material will eventually go to stock in the treating plant and be reported as B.S. Traces of web or sludge, however, will disappear or be removed in the normal treating plant.

In almost all instances the thief grind-out and excess chemical grind-out readings indicate the formula that has most nearly produced crude oil free from B.S. and water. The most efficient emulsion-breaking chemical is determined by the foregoing test procedure by the overall consideration of the following factors: relative speed of the breaking of the emulsion which is usually indicated by speed of water drop, color and brilliance of the oil layer, the relative absence of web or sludge at oil-water line and the ability to most nearly produce treated oil that is free from B.S. and water.

By way of illustrating the effectiveness of the emulsion-breaking chemicals contemplated by this invention, the composition of Example 2 was tested according to the foregoing bottle testing procedure on samples of 21 gravity crude oil obtained from South Mountain Field, California. The crude oil emulsion contained over 11% water. The commercial treating chemical being used on the lease, as well as the composition of Example 2, was tested for comparative purposes. The treating chemicals were added at a ratio of 0.15 and 0.25 part of a 10% solution, as described in the foregoing procedure, to 100 parts of the emulsion fluid. At the 0.15 part level, the samples were given 200 shakes cold and 100 shakes hot. At the 0.25 part level, the samples were given only 50 easy shakes hot, the hot temperature in both instances being 175° F. The observations made during the tests were recorded and are summarized in the following table.

TABLE I

| Treating Chemical | Ratio | Water Drop | | Thief Grind-Out | |
|---|---|---|---|---|---|
| | | (*) | 2½ hr. | B.S. | Water |
| Commercial chemical | 0.15 | Trace | 5 | 4.8 | 1.2 |
| Example 2 | 0.15 | 4 | 9 | 1.8 | 0.6 |
| Commercial chemical | 0.25 | 2 | 10 | | |
| Example 2 | 0.25 | 6 | 11 | 1.4 | 0.4 |

*Before hot agitation

A similar test on the same crude oil was run after mixing 20 cc. of 5% brine water with 100 cc. of the crude oil emulsion. The treating chemicals were added at a ratio of 0.15 part of a 10% solution to the 120 cc. of fluid, and the agitation was the same as that for the 0.15 ratio, above. The data recorded is summarized in the following table.

TABLE II

| Treating Chemical | Water Drop | | Thief Grind-Out | | Excess Grind-Out | |
|---|---|---|---|---|---|---|
| | (*) | 2½ hr | B.S. | Water | B.S. | Water |
| Commercial Chemical | 25 | 28 | 3.6 | 0.4 | 0 | 4.4 |
| Example 2 | 31 | 35 | 0.2 | 0.4 | 0 | 3.0 |

*Before hot agitation.

DESALTING

Desalting bottle tests were run in a related manner to the foregoing bottle testing procedure on samples of crude oil which had been agitated with a small percentage of water in a blender. The compositions of Examples 1 and 2, at treating ratios of 0.01–0.02 part to 100 parts of sample, gave an excellent water drop and compared quite favorably with the other emulsion-breaking chemicals tested.

A refinery desalting test was also run for several days with the composition of Example I. The refinery was processing in an electrical desalter Wyoming and Adams crudes, using approximately 7% wash water, at temperatures in the range of 201–208° F. During the test, the B.S. and W. content of the desalted crude remained below 0.8%, and the salt content of the desalted crude was only a trace per thousand barrels throughout most of the test period. The effluent water was clear throughout the test. The use of Example I resulted in a reduction of chemical from the approximately one gallon of chemical per thousand barrels of oil previously required to approximately one-half gallon of chemical per thousand barrels of oil, thus affording about a 50% reduction in treating cost.

The invention is hereby claimed as follows:

1. In processes for breaking petroleum oil emulsions of the water-in-oil type, the improvement which comprises subjecting said emulsions to the action of organic, monocarboxylic acid esters of oxyalkylated alkyl phenol-formaldehyde-alkylene polyamine resins, said alkyl phenol being at least 75% difunctional alkyl phenol with the alkyl groups of the alkyl phenol having an average number of carbons in the range of 4–15, said resins having about 4–15 phenolic nuclei per molecule, said resins being oxyalkylated with lower alkylene oxides having 2–3 carbons at a weight ratio of alkylene oxide to resins between about 2:3 and 10:1, respectively, at least one hydroxyl group per resin molecule being esterified with said carboxylic acid, at least a portion of the alkylene polyamine groups in said resins being chemically combined internally in the structure of said phenol-formaldehyde-alkylene polyamine resins, said carboxylic acid having 2–36 carbons, the mol ratio of the phenol to the polyamine in said resin being in the range of 1:1 to 10:1, respectively, at least a part of the phenol and the polyamine being combined in the resin structure by the grouping

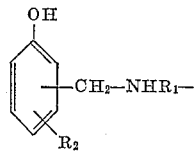

wherein $R_2$ is the alkyl group of the phenol and is in one of the positions ortho and para to the —OH group, and $R_1$ is the monovalent residue of the alkylene polyamine, said residue of the alkylene polyamine containing 2–6 carbon atoms per alkylene group and 1–9 amino groups, said resin being formed by the polycondensation of a mixture of said alkyl phenol, said formaldehyde, and said alkylene polyamine, the latter having two primary amino groups and 2–6 carbons per alkylene group.

2. In processes for breaking petroleum oil emulsions of the water-in-oil type, the improvement which comprises subjecting said emulsions to the action of organic, dicarboxylic acid esters of oxyalkylated alkyl phenol-formaldehyde-alkylene polyamine resins, said alkyl phenol being at least 75% difunctional alkyl phenol with the alkyl groups of the alkyl phenol having an average number of carbons in the range of 4–15, said resins having about 4–15 phenolic nuclei per molecule, said resins being oxyalkylated with lower alkylene oxides having 2–3 carbons at a weight ratio of alkylene oxide to resins between about 2:3 and 10:1, respectively, at least one hydroxyl group per resin molecule being esterified with said carboxylic acid, at least a portion of the alkylene polyamine groups in said resins being chemically combined internally in the structure of said phenol-formaldehyde-alkylene polyamine resins, said carboxylic acid having 2–36 carbons, the mol ratio of the phenol to the polyamine in said resin being in the range of 1:1 to 10:1, respectively, at least a part of the phenol and the polyamine being combined in the resin structure by the grouping

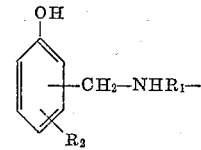

wherein $R_2$ is the alkyl group of the phenol and is in one of the positions ortho and para to the —OH group, and $R_1$ is the monovalent residue of the alkylene polyamine, said residue of the alkylene polyamine containing 2–6 carbon atoms per alkylene group and 1–9 amino groups, said resin being formed by the polycondensation of a mixture of said alkyl phenol, said formaldehyde, and said alkylene polyamine, the latter having two primary amino groups and 2–6 carbons per alkylene group.

3. The process of claim 2 wherein at least a portion of the esters comprise polyesters of the dicarboxylic acid and oxyalkylated resin.

4. In processes for breaking petroleum oil emulsions of the water-in-oil type as claimed in claim 2 wherein at least a portion of the esters comprise polyesters of an organic, dicarboxy acid having 3–6 carbons and oxyalkylated resin, and separating the oil and water phases of the broken emulsions.

5. In a process for breaking petroleum oil emulsions of the water-in-oil type, the improvement which comprises subjecting said emulsions to the action of organic, carboxylic acid esters of both monocarboxylic and dicarboxylic acids and oxyalkylated alkyl phenol-formaldehyde-alkylene polyamine resins, said alkyl phenol being at least 75% difunctional alkyl phenol with the alkyl groups of the alkyl phenol having an average number of carbons in the range of 4–15, said resins having about 4–15 phenolic nuclei per molecule, said resins being oxyalkylated with lower alkylene oxides having 2–3 carbons at a weight ratio of alkylene oxide to resins between about 2:3 and 10:1, respectively, at least one hydroxyl group per resin molecule being esterified with said acids, said carboxylic acid having 2–36 carbons, the mol ratio of the phenol to the polyamine in said resin being in the range of 1:1 to 10:1, respectively, at least a part of the phenol and the polyamine being combined in the resin structure by the grouping

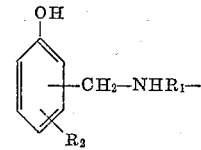

wherein $R_2$ is the alkyl group of the phenol and is in one of the positions ortho and para to the —OH group, and $R_1$ is the monovalent residue of the alkylene polyamine, said residue of the alkylene polyamine containing 2–6 carbon atoms per alkylene group and 1–9 amino groups, said resin being formed by the polycondensation of a mixture of said alkyl phenol, said formaldehyde, and said alkylene polyamine, the latter having two primary amino groups and 2–6 carbons per alkylene group.

6. The process of claim 5 wherein the monocarboxylic acids are those of crude tall oil.

7. In processes for breaking petroleum oil emulsions of the water-in-oil type, subjecting said emulsions to the action of diglycolic acid esters of oxyalkylated alkyl phenol-formaldehyde-alkylene polyamine resins, said alkyl phenol being at least 75% difunctional, monoalkyl phenol with 5–15 carbon alkyl groups, said resins having about 4–15 phenolic nuclei per molecule, said resins being oxyalkylated with lower alkylene oxides having 2–3 carbon at a weight ratio of alkylene oxide to resins between about 2:3 and 10:1, respectively, at least one hydroxyl group per resin molecule being esterified with said acid, said carboxylic acid having 2-36 carbons, the mol ratio of the phenol to the polyamine in said resin being in the range of 1:1 to 10:1, respectively, at least a part of the phenol and the polyamine being combined in the resin structure by the grouping

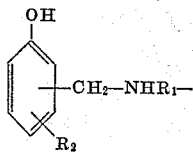

wherein $R_2$ is the alkyl group of the phenol and is in one of the positions ortho and para to the —OH group, and $R_1$ is the monovalent residue of the alkylene polyamine, said residue of the alkylene polyamine containing 2-6 carbon atoms per alkylene group and 1-9 amino groups, said resin being formed by the polycondensation of a mixture of said alkyl phenol, said formaldehyde, and said alkylene polyamine, the latter having two primary amino groups and 2-6 carbons per alkylene group.

8. In processes for breaking petroleum oil emulsions of the water-in-oil type, the improvement which comprises subjecting said emulsions to the action of dimerized fatty acid esters of oxyalkylated alkyl phenol-formaldehyde-alkylene polyamine resins, said alkyl phenol being at least 75% difunctional, monoalkyl phenol with 5-15 carbon alkyl groups, said resins having about 4-15 phenolic nuclei per molecule, said resins being oxyalkylated with lower alkylene oxides having 2-3 carbons at a weight ratio of alkylene oxide to resins between about 2:3 and 10:1, respectively, at least one hydroxyl group per resin molecule being esterified with said acid, said carboxylic acid having 2-36 carbons, the mol ratio of the phenol to the polyamine in said resin being in the range of 1:1 to 10:1, respectively, at least a part of the phenol and the polyamine being combined in the resin structure by the grouping

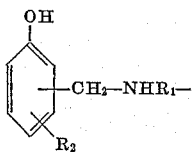

wherein $R_2$ is the alkyl group of the phenol and is in one of the positions ortho and para to the —OH group, and $R_1$ is the monovalent residue of the alkylene polyamine, said residue of the alkylene polyamine containing 2-6 carbon atoms per alkylene group and 1-9 amino groups, said resin being formed by the polycondensation of a mixture of said alkyl phenol, said formaldehyde, and said alkylene polyamine, the latter having two primary amino groups and 2-6 carbons per alkylene group.

9. In processes for breaking petroleum oil emulsions of the water-in-oil type, the improvement which comprises subjecting said emulsions to the action of organic, monocarboxylic acid esters of oxyalkylated alkyl phenol-formaldehyde-alkylene polyamine resins, said alkyl phenol being at least 75% difunctional, monoalkyl phenol with 5-15 carbon alkyl groups, said resins having about 4-15 phenolic nuclei per molecule, said resins being oxyalkylated with lower alkylene oxides having 2-3 carbons at a weight ratio of alkylene oxide to resins between about 2:3 and 10:1, respectively, at least one hydroxyl group per resin molecule being esterified with said acid, said carboxylic acid having 2-36 carbons, the mol ratio of the phenol to the polyamine in said resin being in the range of 1:1 to 10:1, respectively, at least a part of the phenol and the polyamine being combined in the resin structure by the grouping

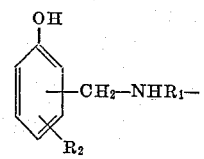

wherein $R_2$ is the alkyl group of the phenol and is in one of the positions ortho and para to the —OH group, and $R_1$ is the monovalent residue of the alkylene polyamine, said residue of the alkylene polyamine containing 2-6 carbon atoms per alkylene group and 1-9 amino groups, said resin being formed by the polycondensation of a mixture of said alkyl phenol, said formaldehyde, and said alkylene polyamine, the latter having two primary amino groups and 2-6 carbons per alkylene group.

10. In processes for breaking petroleum oil emulsions of the water-in-oil type, the improvement which comprises subjecting said emulsions to the action of organic, dicarboxylic acid esters of oxyalkylated alkyl phenol-formaldehyde-alkylene polyamine resins, said alkyl phenol being at least 75% difunctional, monoalkyl phenol with 5-15 carbon alkyl groups, said resins having about 4-15 phenolic nuclei per molecule, said resins being oxyalkylated with lower alkylene oxides having 2-3 carbons at a weight ratio of alkylene oxide to resins between about 2:3 and 10:1, respectively, at least one hydroxyl group per resin molecule being esterified with said acid, said carboxylic acid having 2-36 carbons, the mol ratio of the phenol to the polyamine in said resin being in the range of 1:1 to 10:1, respectively, at least a part of the phenol and the polyamine being combined in the resin structure by the grouping

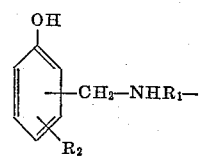

wherein $R_2$ is the alkyl group of the phenol and is in one of the positions ortho and para to the —OH group, and $R_1$ is the monovalent residue of the alkylene polyamine, said residue of the alkylene polyamine containing 2-6 carbon atoms per alkylene group and 1-9 amino groups, said resin being formed by the polycondensation of a mixture of said alkyl phenol, said formaldehyde, and said alkylene polyamine, the latter having two primary amino groups and 2-6 carbons per alkylene group.

11. Processes of desalting mineral oils which comprise mixing mineral oils containing water-soluble salts with water, subjecting the resultant mixtures to the action of organic carboxylic acid esters of oxyalkylated alkyl phenol-formaldehyde-alkylene polyamine resins, said alkyl phenol being at least 75% difunctional alkyl phenol with the alkyl groups of the alkyl phenol having an average number of carbons in the range of 4-15, said resins having about 4-15 phenolic nuclei per molecule, said resins being oxyalkylated with lower alkylene oxides having 2-3 carbons at a weight ratio of alkylene oxide to resins between about 2:3 and 10:1, respectively, at least one hydroxyl group per resin molecule being esterified, and thereafter separating the water from the oil, said carboxylic acid having 2-36 carbons, the mol ratio of the phenol to the polyamine in said resin being in the range of 1:1 to 10:1, respectively, at least a part of the phenol and the polyamine being combined in the resin structure by the grouping

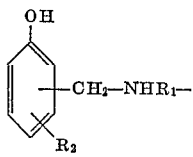

wherein $R_2$ is the alkyl group of the phenol and is in one of the positions ortho and para to the —OH group, and $R_1$ is the monovalent residue of the alkylene polyamine, said residue of the alkylene polyamine containing 2–6 carbon atoms per alkylene group and 1–9 amino groups, said resin being formed by the polycondensation of a mixture of said alkyl phenol, said formaldehyde, and said alkylene polyamine, the latter having two primary amino groups and 2–6 carbons per alkylene group.

12. Processes of desalting mineral oils which comprise mixing mineral oils containing water-soluble salts with water, subjecting the resultant mixtures to the action of organic carboxylic acid esters of oxyalkylated alkyl phenol-formaldehyde alkylene polyamine resins, said alkyl phenol being at least 75% difunctional, monoalkyl phenol with 5–15 carbon alkyl groups, said resins having about 4–15 phenolic nuclei per molecule, said resins being oxyalkylated with lower alkylene oxides having 2–3 carbons at a weight ratio of alkylene oxide to resins between about 2:3 and 10:1, respectively, at least one hydroxy group per resin molecule being esterified, and thereafter separating the water from the oil, said carboxylic acid having 2–36 carbons, the mol ratio of the phenol to the polyamine in said resin being in the range of 1:1 to 10:1, respectively, at least a part of the phenol and the polyamine being combined in the resin structure by the grouping

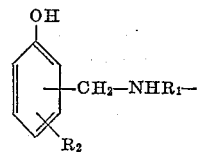

wherein $R_2$ is the alkyl group of the phenol and is in one of the positions ortho and para to the —OH group, and $R_1$ is the monovalent residue of the alkylene polyamine, said residue of the alkylene polyamine containing 2–6 carbon atoms per alkylene group and 1–9 amino groups, said resin being formed by the polycondensation of a mixture of said alkyl phenol, said formaldehyde, and said alkylene polyamine, the latter having two primary amino groups and 2–6 carbons per alkylene group.

References Cited in the file of this patent

UNITED STATES PATENTS

| | | |
|---|---|---|
| 2,454,544 | Block et al. | Nov. 23, 1948 |
| 2,499,365 | De Groote et al. | Mar. 7, 1950 |
| 2,507,910 | Keiser et al. | May 16, 1950 |
| 2,658,885 | D'Alelio | Nov. 10, 1953 |
| 2,695,884 | Smith | Nov. 30, 1954 |
| 2,695,889 | De Groote | Nov. 30, 1954 |
| 2,743,243 | De Groote | Apr. 24, 1956 |
| 2,743,245 | De Groote | Apr. 24, 1956 |
| 2,839,502 | De Groote | June 17, 1958 |
| 2,854,528 | De Groote | Sept. 30, 1958 |

UNITED STATES PATENT OFFICE
CERTIFICATE OF CORRECTION

Patent No. 3,169,118                      February 9, 1965

Willard H. Kirkpatrick et al.

It is hereby certified that error appears in the above numbered patent requiring correction and that the said Letters Patent should read as corrected below.

Column 16, line 26, for "3-6" read -- 2-36 --; line 74, for "carbon" read -- carbons --.

Signed and sealed this 17th day of August 1965.

(SEAL)
Attest:

ERNEST W. SWIDER                      EDWARD J. BRENNER
Attesting Officer                     Commissioner of Patents